US009462296B2

(12) United States Patent
Chen et al.

(10) Patent No.: US 9,462,296 B2
(45) Date of Patent: Oct. 4, 2016

(54) METHOD AND SYSTEM FOR MOTION-COMPENSATED FRAME-RATE UP-CONVERSION FOR BOTH COMPRESSED AND DECOMPRESSED VIDEO BITSTREAMS

(71) Applicant: Broadcom Corporation, Irvine, CA (US)

(72) Inventors: Xuemin Sherman Chen, Rancho Santa Fe, CA (US); Marcus Kellerman, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/936,286

(22) Filed: Nov. 9, 2015

(65) Prior Publication Data

US 2016/0065991 A1     Mar. 3, 2016

Related U.S. Application Data

(63) Continuation of application No. 12/427,440, filed on Apr. 21, 2009, now Pat. No. 9,185,426, which is a continuation-in-part of application No. 12/400,736, filed on Mar. 9, 2009, now abandoned.

(60) Provisional application No. 61/090,075, filed on Aug. 19, 2008.

(51) Int. Cl.
*H04N 19/597* (2014.01)
*H04N 19/172* (2014.01)
(Continued)

(52) U.S. Cl.
CPC .......... *H04N 19/597* (2014.11); *H04N 19/132* (2014.11); *H04N 19/139* (2014.11);
(Continued)

(58) Field of Classification Search
CPC .................................................. H04N 19/597
USPC ......................................................... 725/105
See application file for complete search history.

(56) References Cited

U.S. PATENT DOCUMENTS 6,549,574 B1    4/2003  De Bart et al.
2004/0013399 A1    1/2004  Horiguchi et al.
(Continued)

FOREIGN PATENT DOCUMENTS

KR    2007-0040397    4/2007
WO    WO-2009/032255    3/2009

OTHER PUBLICATIONS

European Search Report in co-pending, related EP Application No. 10003916.3, mailed Jul. 22, 2013.
Jung, Il-Lyong, et al., "Efficient Stereo Video Coding Based on Frame Skipping for Real-Time Mobile Applications", IEEE Transactions on Consumer Electronics, IEEE Service Center, NY, NY, vol. 54, No. 3, Aug. 1, 2008, pp. 1259-1266.
(Continued)

*Primary Examiner* — Yulin Sun
(74) *Attorney, Agent, or Firm* — Foley & Lardner LLP; Christopher J. McKenna; Helen H. Zhang

(57) ABSTRACT

A video receiver is operable to receive three-dimensional (3D) video bitstreams from a video transmitter. The received 3D video bitstreams comprises a plurality of video frames and corresponding coding information. The coding information, for example, block motion vectors, block coding modes, quantization levels, and/or quantized residual data, is extracted for performing frame-rate up-conversion on the received plurality of video frames. The coding information is generated at the video transmitter via entropy decoding on a compressed 3D video from a video feed from, for example, an IP TV network. When an uncompressed 3D video is received, the video receiver is operable to perform frame-rate up-conversion on the received uncompressed 3D video using extracted block motion vectors and associated confidence-consistence measure. When a compressed 3D video is received, the video receiver is configured to perform video decompression on the received compressed 3D video prior to the frame-rate up-conversion.

20 Claims, 12 Drawing Sheets

(51) Int. Cl.

| | | |
|---|---|---|
| *H04N 19/132* | (2014.01) | |
| *H04N 19/142* | (2014.01) | |
| *H04N 19/587* | (2014.01) | |
| *H04N 19/513* | (2014.01) | |
| *H04N 19/139* | (2014.01) | |
| *H04N 19/87* | (2014.01) | |
| *H04N 19/615* | (2014.01) | |
| *H04N 19/44* | (2014.01) | |
| *H04N 19/86* | (2014.01) | |
| *H04N 19/40* | (2014.01) | |

(52) U.S. Cl.
CPC .......... *H04N19/142* (2014.11); *H04N 19/172* (2014.11); *H04N 19/521* (2014.11); *H04N 19/587* (2014.11); *H04N 19/615* (2014.11); *H04N 19/87* (2014.11); *H04N 19/40* (2014.11); *H04N 19/44* (2014.11); *H04N 19/86* (2014.11)

(56) References Cited

U.S. PATENT DOCUMENTS

| | | |
|---|---|---|
| 2005/0195324 A1 | 9/2005 | Lee |
| 2005/0210515 A1* | 9/2005 | Roh ................. H04N 7/163 725/81 |
| 2005/0265451 A1* | 12/2005 | Shi ................. H04N 19/577 375/240.15 |
| 2006/0120466 A1 | 6/2006 | Yoshinari et al. |
| 2007/0211800 A1 | 9/2007 | Shi et al. |
| 2008/0310499 A1 | 12/2008 | Kim et al. |
| 2009/0063935 A1 | 3/2009 | Singh et al. |
| 2009/0125538 A1 | 5/2009 | Rosenzweig et al. |
| 2010/0177239 A1 | 7/2010 | Servais et al. |
| 2011/0037561 A1 | 2/2011 | True et al. |

OTHER PUBLICATIONS

Office Action for Chinese Patent Application No. 200910170901.4 dated Nov. 15, 2010 (including English summary).

Office Action for Chinese Patent Application No. 200910170901.4 dated Aug. 12, 2011 (including English summary).

Chi Wah Tang et al: "Comparison between block-based and pixel-based temporal interpolation for video coding", Circuits and Systems, 1998. ISCAS '98. Proceedings of the 1998 IEEE International Symposium on Monterey, CA, USA May 31-Jun. 3, 1998, New York, NY, USA,IEEE, US, vol. 4, May 31, 1998, pp. 122-125.

Summons to attend oral proceeding for European Patent Application No. 10003916.3 mailed Sep. 16, 2014.

Office Action for Chinese Patent Application No. 201010150205.X mailed May 5, 2014 (including English Summary).

Office Action for Taiwan Application No. 99112456 mailed Jun. 26, 2014 (including English summary).

International Search Report for PCT/US2008/010334 mailed Mar. 11, 2009.

Non-Final Office Action for U.S. Appl. No. 12/427,440 mailed Sep. 1, 2011.

Final Office Action for U.S. Appl. No. 12/427,440 mailed Apr. 5, 2012.

Non-Final Office Action for U.S. Appl. No. 12/427,440 mailed Aug. 26, 2014.

Final Office Action for U.S. Appl. No. 12/427,440 mailed Mar. 26, 2015.

Notice of Allowance for U.S. Appl. No. 12/427,440 mailed Jul. 7, 2015.

Non-Final Office Action for U.S. Appl. No. 12/400,736 mailed Aug. 19, 2011.

Final Office Action for U.S. Appl. No. 12/400,736 mailed Apr. 4, 2012.

Office Action for Chinese Patent Application No. 201010150205X mailed Mar. 8, 2016 (including English Summary).

* cited by examiner

METHOD AND SYSTEM FOR MOTION-COMPENSATED FRAME-RATE UP-CONVERSION FOR BOTH COMPRESSED AND DECOMPRESSED VIDEO BITSTREAMS

CROSS-REFERENCE TO RELATED APPLICATIONS/INCORPORATION BY REFERENCE

This application is a continuation of and claims priority to and the benefit of U.S. patent application Ser. No. 12/427,440, filed Apr. 21, 2009, which is a continuation in part of and claims priority to and the benefit of U.S. application Ser. No. 12/400,736 filed on Mar. 9, 2009, which makes reference to, claims priority to, and claims the benefit of U.S. Provisional Patent Application Ser. No. 61/090,075 filed on Aug. 19, 2008.

The above stated applications are hereby incorporated herein by reference in their entireties for all purposes.

FIELD OF THE INVENTION

Certain embodiments of the invention relate to digital video processing. More specifically, certain embodiments of the invention relate to a method and system for motion-compensated frame-rate up-conversion for both compressed and decompressed video bitstreams.

BACKGROUND OF THE INVENTION

A major revolution in video display technology includes flat screens based on either liquid crystal display (LCD) or plasma display panel (PDP) technology, which are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition (SD) television (TV) to high-definition (HD) television.

Formats with lower picture-rates may be utilized in legacy video compression systems for displaying legacy video on modern display screens. There may be restrictions on channel capacity that may affect the display of low picture-rate pictures. For example, consider a 30 Hz video sequence that may be broadcast over a mobile network, and terminals, for example, mobile phones that may receive an encoded video sequence from a server. However, due to bandwidth limitations, only a low bit-rate video sequence may be communicated. As a result, the encoder may remove two out of every three pictures to be transmitted, resulting in a sequence with a picture rate of about 10 Hz, for example. The available channel capacity may be different in diverse video services. The legacy systems may be different in different regions of the world, for example, NTSC, SECAM or PAL.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for motion-compensated frame-rate up-conversion for both compressed and decompressed video bitstreams, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for motion-compensated frame-rate up-conversion for both compressed and decompressed video bitstreams. Various embodiments of the invention may comprise a video receiver such as a wireless high definition receiver, which may be operable to receive video bitstreams, for example three-dimensional (3D) video bitstreams, from a video transmitter such as a wireless high definition transmitter. The received 3D video bitstreams may comprise coding information in conjunction with a plurality of video frames for display. The coding information may be extracted and utilized for performing frame-rate up-conversion on the received plurality of video frames for display. The coding information such as, for example, block motion vectors, block coding modes, quantization levels, and/or quantized residual data, may be generated by the wireless high definition transmitter via entropy decoding a compressed 3D video from a video feed from, for example, an IP TV network and satellite broadcasting network. The received 3D video bitstreams may be uncompressed or compressed. In instances where a plurality of decoded video frames may be received, the wireless high definition receiver may be operable to generate a plurality of interpolated video frames for the received decoded video frames by the wireless high definition receiver using the extracted corresponding coding information and associated measure such as, for example, one or both of motion vector confidence and/or consistence.

In instances where an uncompressed video such as MPEG-2 or MPEG-4 may be received, the wireless high definition receiver may be operable to decompress the received compressed 3D video resulting in a plurality of decoded video frames. The decompression may occur prior to the frame-rate up-conversion. The wireless high definition receiver may be operable to perform frame-rate up-conversion as described early on the resulted plurality of decoded video frames.

Figure 1:
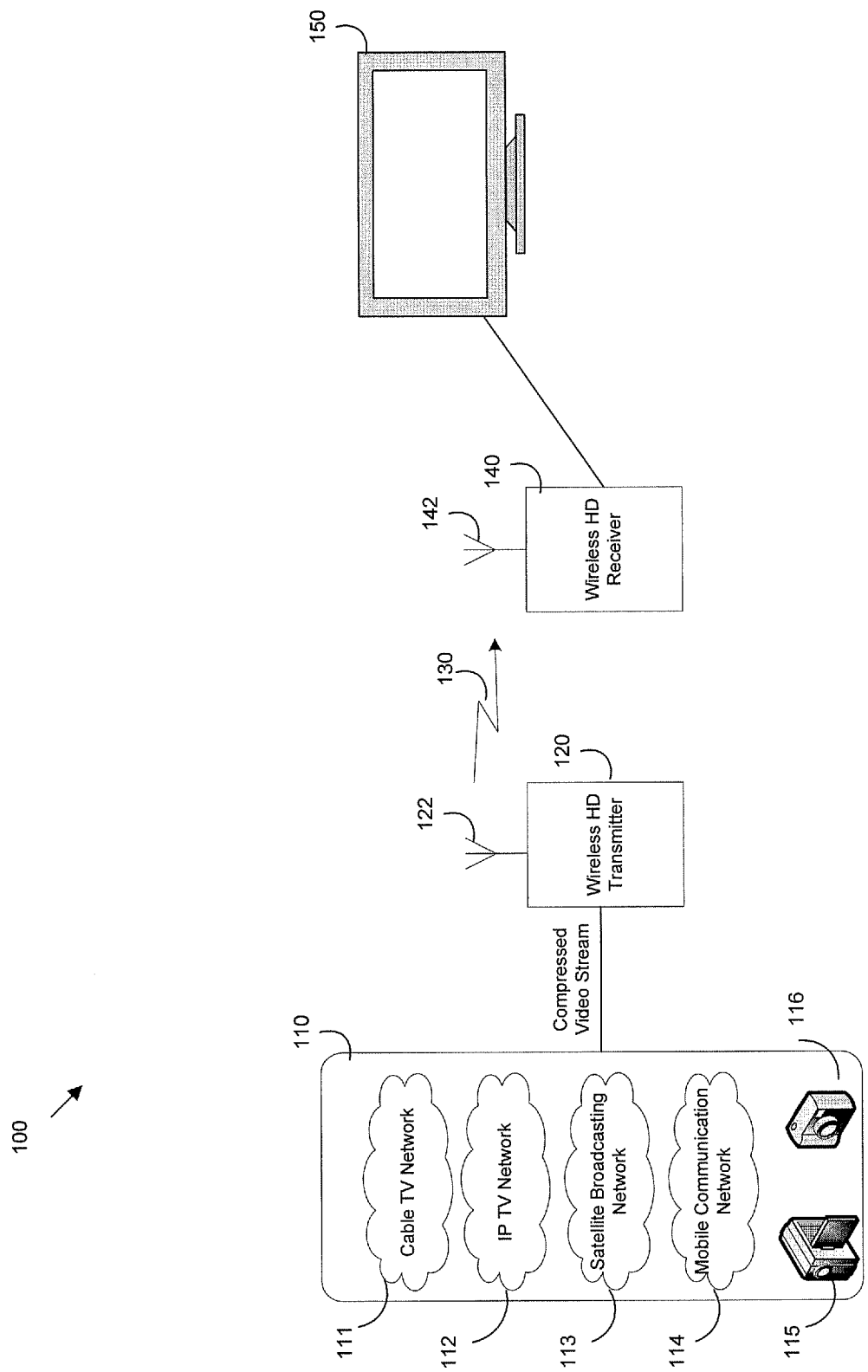
FIG. 1 is a block diagram of an exemplary wireless HD System for transmitting video bitstreams from a wireless HD transmitter to a wireless HD receiver over a wireless HD transmission link, in accordance with an embodiment of the invention.

FIG. 1 is a block diagram of an exemplary wireless HD System for transmitting video bitstreams from a wireless HD transmitter to a wireless HD receiver over a wireless HD transmission link, in accordance with an embodiment of the invention. Referring to FIG. 1, there is shown a wireless HD system 100.

The wireless HD system 100 may comprise a video feed 110, a wireless HD transmitter 120, an antenna 122, a wireless HD transmission link 130, a wireless HD receiver 140, an antenna 142, and a display device 150. The video feed 110 may comprise a cable TV network 111, an IP TV network 112, a satellite broadcasting network 113, a mobile communication network 114, a camera 115, and/or a video camera 116, respectively. The wireless HD system 100 may be enabled to stream high definition audio and video over a wireless link such as the wireless HD transmission link 130. The wireless HD system 100 may be configured to support various industry standards such as, for example, Wireless High-definition Interface (WirelessHD) standard and/or Wireless High-definition Interface (WHDI) standard. The wireless HD system 100 may be configured to support various 3D services such as stereoscopic 3D program and stereoscopic 3D visual objects.

The video feed 110 may comprise suitable logic, circuitry, and/or code that may be operable to provide compressed video bitstreams with lower frame-rates to the wireless HD transmitter 120. The compressed video bitstreams comprises 2D video bitstreams and/or 3D video bitstreams. The compressed video bitstreams may be formed by using various video compression algorithms such as specified in MPEG-2, MPEG-4, MPEG-4/AVC, VC1, VP6, and/or other video formats that may allow forward, backward, and bidirectional predictive coding. The received compressed video bitstreams may be provided by a direct video feed such as, for example, the camera 115 and/or the video camera 116. The received compressed video bitstreams may be provided by various indirect video feeds such as, for example, the cable TV network 111, the IP TV network 112, the satellite broadcasting network 113, and/or the mobile communication network 114, respectively.

The antenna 122 may comprise suitable logic, circuitry and/or code that may be operable to transmit signals in radio frequency (RF) bands. In this regard, the transmitted signals may comprise uncompressed video data and/or compressed video data to the wireless HD receiver 140. Although a single antenna 122 is illustrated in FIG. 1, the invention may not be so limited. Accordingly, one or more antennas may be utilized for transmitting signals to the wireless HD receiver 140 in radio frequency (RF) bands from the wireless HD transmitter 120 without departing from the spirit and scope of various embodiments of the invention.

The wireless HD transmitter 120 may comprise suitable logic, circuitry, and/or code that may be operable to communicate various data such as compressed video data and/or decompressed video data with the wireless HD receiver 140 over the wireless HD transmission link 130. In this regard, the wireless HD transmitter 120 may be operable to communicate compressed and/or decompressed 2D video bitstreams and/or 3D video bitstreams with the wireless HD receiver 140 over the wireless HD transmission link 130. The wireless HD transmitter 120 may be configured to accept compressed video bitstreams with lower frame-rates from the video feed 110. The accepted compressed video bitstreams with lower frame-rates may be communicated with the wireless HD receiver 140 over the wireless HD transmission link 130. In one embodiment of the invention, the wireless HD transmitter 120 may be operable to communicate with the wireless HD receiver 140 to determine a video format that the wireless HD receiver 140 may support. The determined video format may comprise, for example, uncompressed, MPEG-2, MPEG-4, VC1, and/or VP6. In this regard, the wireless HD transmitter 120 may be configured to transmit the accepted compressed video bitstreams in the determined video format, whether uncompressed or compressed.

In instances where the wireless HD transmitter 120 may be operable to transmit uncompressed video bitstreams to the wireless HD receiver 140, the wireless HD transmitter 120 may firstly be configured to decompress the accepted compressed video bitstreams from the video feed 110, then, transmit the decompressed video bitstreams to the wireless HD receiver 140 over the wireless HD transmission link 130. In another embodiment of the invention, the wireless HD transmitter 120 may be operable to extract coding information via, for example, entropy decoding, from the accepted compressed video bitstreams from the video feed 110. The extracted coding information may comprise, for example, block motion vectors, block coding modes, quantization levels, and/or quantized residual data, associated with the accepted compressed video bitstreams. The extracted coding information may be formatted or re-formatted using the determined video format and may be transmitted together with the accepted compressed video bitstreams or the decompressed video bitstreams to the wireless HD receiver 140 over the wireless HD transmission link 130.

The wireless HD transmission link 130 may comprise suitable logic, circuitry, and/or code that may be operable to support wireless high-definition (HD) signal transmission. The wireless HD transmission link 130 may be configured to communicate HD signals in adherence with, for example, the WirelessHD standard. The WirelessHD standard may be specified based on the 7 GHz of continuous bandwidth around the 60 GHz radio frequency. The WirelessHD may be utilized for uncompressed digital transmission of full HD video and a combination of audio and data signals. The WirlessHD may be essentially equivalent, in theory, to a high definition multimedia interface (HDMI). The HDMI is a compact audio/video interface for transmitting uncompressed digital data. In this regard, the wireless HD transmission link 130 may be configured to communicate both uncompressed video bitstreams and compressed video bitstreams between the wireless HD transmitter 120 and the wireless HD receiver 140. The wireless HD transmission link 130 may be configured to handle transmission data rates as high as, for example, 25 Gbit/s, thereby enabling scaling desired video bitstreams to higher resolutions, color depth, and/or range. In this regard, the wireless HD transmission link 130 may be enabled to communicate 3D signals in adherence with, for example, 3DTV technology to support various 3D data services such as a 3D program on a large-scale basis.

The antenna 142 may comprise suitable logic, circuitry and/or code that may be operable to receive signals in radio frequency (RF) bands. In this regard, the antenna 142 may be operable to receive video signals comprising uncompressed or compressed video bitstreams from the wireless HD transmitter 120. Although the single antenna 142 is illustrated in FIG. 1, the invention may not be so limited. Accordingly, one or more antennas may be utilized for receiving signals in radio frequency (RF) bands by the wireless HD receiver 140 without departing from the spirit and scope of various embodiments of the invention.

The wireless HD receiver 140 may comprise suitable logic, circuitry, interfaces and/or code that may be operable to receive, via the antenna 142, various data such as compressed video bitstreams and/or decompressed video bitstreams from the wireless HD transmitter 120 over the wireless HD transmission link 130. In this regard, the wireless receiver 140 may be operable to receive compressed and/or decompressed 2D video bitstreams and/or 3D video bitstreams from the wireless HD transmitter 120 over the wireless HD transmission link 130. In one embodiment of the invention, the wireless HD receiver 140 may be operable to communicate with the wireless HD receiver 140 to provide a supported video format. The video format may comprise, for example, uncompressed, MPEG-2, MPEG-4, VC1, and/or VP6. In this regard, the wireless HD receiver 140 may be configured to receive uncompressed video bitstreams or compressed video bitstreams depending on a video format determined by the wireless HD transmitter 120. In instances where uncompressed video bitstreams may be received from the wireless HD transmitter 120, the wireless HD receiver 140 may be operable to extract coding information from the received uncompressed video bitstreams. The extracted coding information may comprise, for example, block motion vectors, block coding modes, quantization levels, and/or quantized residual data, associated with the original compressed video bitstreams of the received uncompressed video bitstreams. The extracted coding information may be utilized to perform frame-rate up-conversion at the wireless HD receiver 140. For each of uncompressed video frames of the received uncompressed video bitstreams, the wireless HD receiver 140 may be operable to interpolate one or more intermediate video frames during the frame-rate up-conversion.

The wireless HD receiver 140 may be configured to communicate the interpolated video frames with the display device 150 via, for example, a HDMI interface and/or a Display Port (DP) interface, for display of the interpolated video frames to users. In instances where compressed video bitstreams may be received from the wireless HD transmitter 120, the wireless HD receiver 140 may be operable to extract coding information via entropy decoding from the received compressed video bitstreams. The wireless HD receiver 140 may be configured to decompress the received compressed video bitstreams for a sequence of decoded video frames. The wireless HD receiver 140 may be operable to utilize the sequence of the decoded video frames as reference video frames to perform frame-rate up-conversion with the consideration of the extracted coding information such as block motion vectors. During the frame-rate up-conversion process, the wireless HD receiver 140 may be operable to interpolate one or more intermediate video frames for each of the decoded video frames. The interpolated video frames may be communicated with the display device 150 via, for example, a HDMI and/or a Display port, for display of the interpolated video frames to users.

The display device 150 may comprise suitable logic, circuitry, and/or code that may be operable to display video frames received from the wireless HD receiver 140 to users. In this regard, the display device 150 may be configured to convey three-dimensional images to viewers. The display device 150 may be operable to communicate with the wireless HD receiver 140 using various interfaces such as a high definition multimedia interface (HDMI), Ethernet, and/or a Display port.

Although the wireless HD system 100 is illustrated in FIG. 1, the invention is not so limited. In this regard, the wireless HD transmitter 120 and the wireless HD receiver 140 may be operable to support 3DTV technology without departing from the spirit and scope of various embodiments of the invention. The wireless HD transmitter 120 and the wireless HD receiver 140 may be operable to support wireless or wired communication without departing from the spirit and scope of various embodiments of the invention. The supported wireless or wired communication may be HD or standard definition (SD) for both 2D and/or 3D data services.

In operation, the wireless HD transmitter 120 may be operable to accept compressed video bitstreams from the video feed 110 via the antenna 122. The wireless HD transmitter 120 may be operable to extract coding information from the accepted video bitstreams. The extracted coding information may comprise, for example, block motion vectors, block coding modes, quantization levels, and/or quantized residual data, associated with the accepted compressed video bitstreams. The wireless HD transmitter 120 may be operable to communicate with a target receiver such as the wireless HD receiver 140 over the wireless HD transmission link 130 to determine a video format such as uncompressed, MPEG2, and/or MPEG4 utilized for video transmission to the wireless HD receiver 140. The extracted coding information and the accepted video bitstreams may be formatted or re-formatted using the determined video format to be transmitted together to the wireless HD receiver 140. The wireless HD receiver 140 may be operable to extract coding information from the received video bitstreams, whether uncompressed or compressed, to be utilized for performing frame-rate up-conversion. In instances where the received video bitstreams may be compressed, the wireless HD receiver 140 may be operable to perform video decompression to construct a sequence of decoded video frames prior to the frame-rate up-conversion. The wireless HD receiver 140 may be operable to interpolate one or more intermediate video frames for each of uncompressed vide frames or decoded video frames constructed during the frame-rate up-conversion. The interpolated video frames may be communicated with the display device 150 via HDMI, Ethernet, or Display Port, for display to users.

Figure 2:
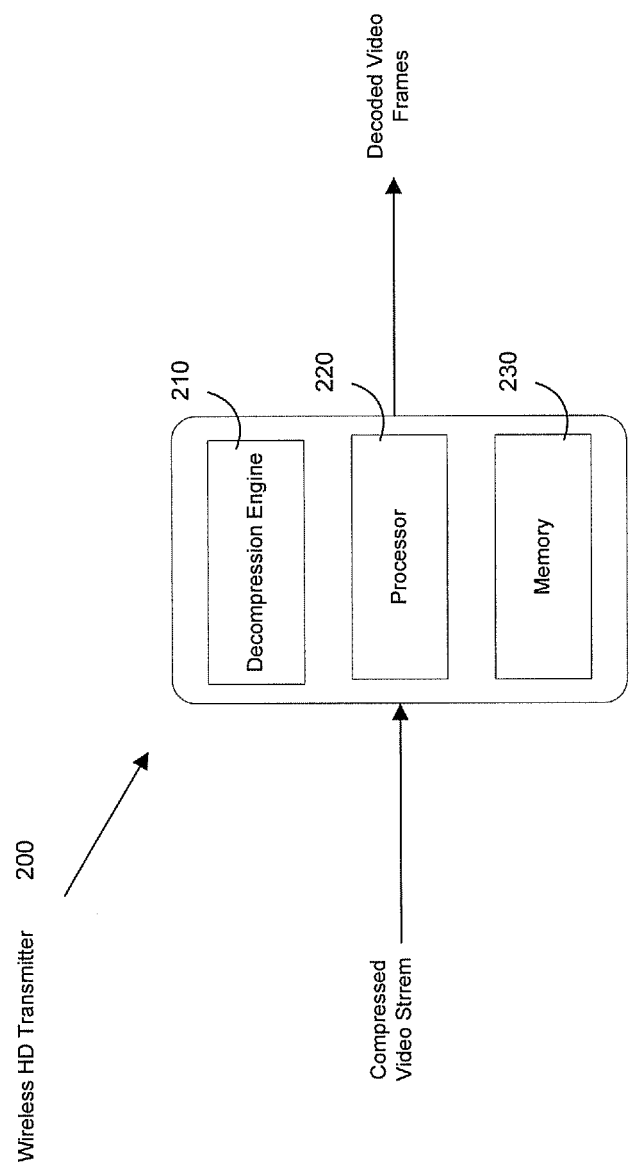
FIG. 2 is a diagram illustrating an exemplary wireless HD transmitter that is operable to transmit decompressed video bitstreams over a wireless HD transmission link, in accordance with an embodiment of the invention.

FIG. 2 is a diagram illustrating an exemplary wireless HD transmitter that is operable to transmit decompressed video bitstreams over a wireless HD transmission link, in accordance with an embodiment of the invention. The wireless HD transmitter 200 may comprise a decompression engine 210, a processor 220, and a memory 230.

The decompression engine 210 may comprise suitable logic, circuitry, interfaces and/or code that may be operable to decompress compressed video bitstreams accepted from the video feed 110 to generate/construct decoded video frames. The decompression engine 210 may be operable to perform various video decompressing techniques such as, for example, entropy decoding, inverse quantization, inverse transform, and motion compensated prediction. The decompression engine 210 may be operable to provide coding information such as, for example, block motion vectors, block coding modes, quantization levels, and quantized residual data. The coding information provided by the decompression engine 210 may be utilized by a target receiver such as the wireless HD receiver 140 to perform frame-rate up-conversion.

The processor 220 may comprise suitable logic, circuitry, interfaces and/or code that may be operable to accept compressed video streams from the video feed 110. The accepted compressed video streams may comprise compressed 2D video bitstreams and/or compressed 3D video bitstreams. The processor 220 may be operable to communicate the accepted compressed video bitstreams with the decompression engine 210 for various video decoding and/or decompressing operations such as, for example, entropy decoding, inverse quantization, inverse transform, and motion compensated prediction. The decoded video frames together with the extracted coding information provided by the decompression engine 210 may be communicated to a target video receiver such as the wireless HD receiver 140. The processor 220 may be operable to communicate with the memory 230 to provide various video decoding algorithms to the decompression engine 210 for various decoding operations. The processor 220 may be configured to communicate with the wireless HD receiver 140 to determine a video format supported for corresponding video transmission. The determined video format may be utilized by the processor 220 to format the decoded video frames as well as the extracted coding information to be transmitted to the wireless HD receiver 140.

The memory 230 may comprise suitable logic, circuitry, interfaces and/or code that may be operable to store information such as executable instructions and data that may be utilized by the processor 220 as well as the decompression engine 210. The executable instructions may comprise decoding algorithms that may be utilized by the decompression engine 210 for various video decoding operations. The data may comprise decoded video frames and extracted coding information such as block motion vectors, block coding modes, quantization levels, and quantized residual data. The memory 230 may comprise RAM, ROM, low latency nonvolatile memory such as flash memory and/or other suitable electronic data storage.

In operation, the processor 220 may be operable to accept compressed video bitstreams with lower frame-rates from a video feed such as the IP TV network 112. The processor 220 may be operable to communicate the accepted compressed video bitstreams with the decompression engine 210 for various video decoding or decompressing operations such as, for example, entropy decoding, inverse quantization, inverse transform, and motion compensated prediction. The decompression engine 210 may be configured to provide decoded video frames and associated coding information such as block motion vectors, block coding modes, quantization levels, and quantized residual data to the processor 220. The decompression engine 210 may be operable to utilize various video decoding algorithms stored in the memory 230 for corresponding video processing operations. The processor 220 may be operable to combine the decoded video frames together with the extracted coding information in a determined format, which may be suitable for a target video receiver such as the wireless HD receiver 140.

Figure 3:
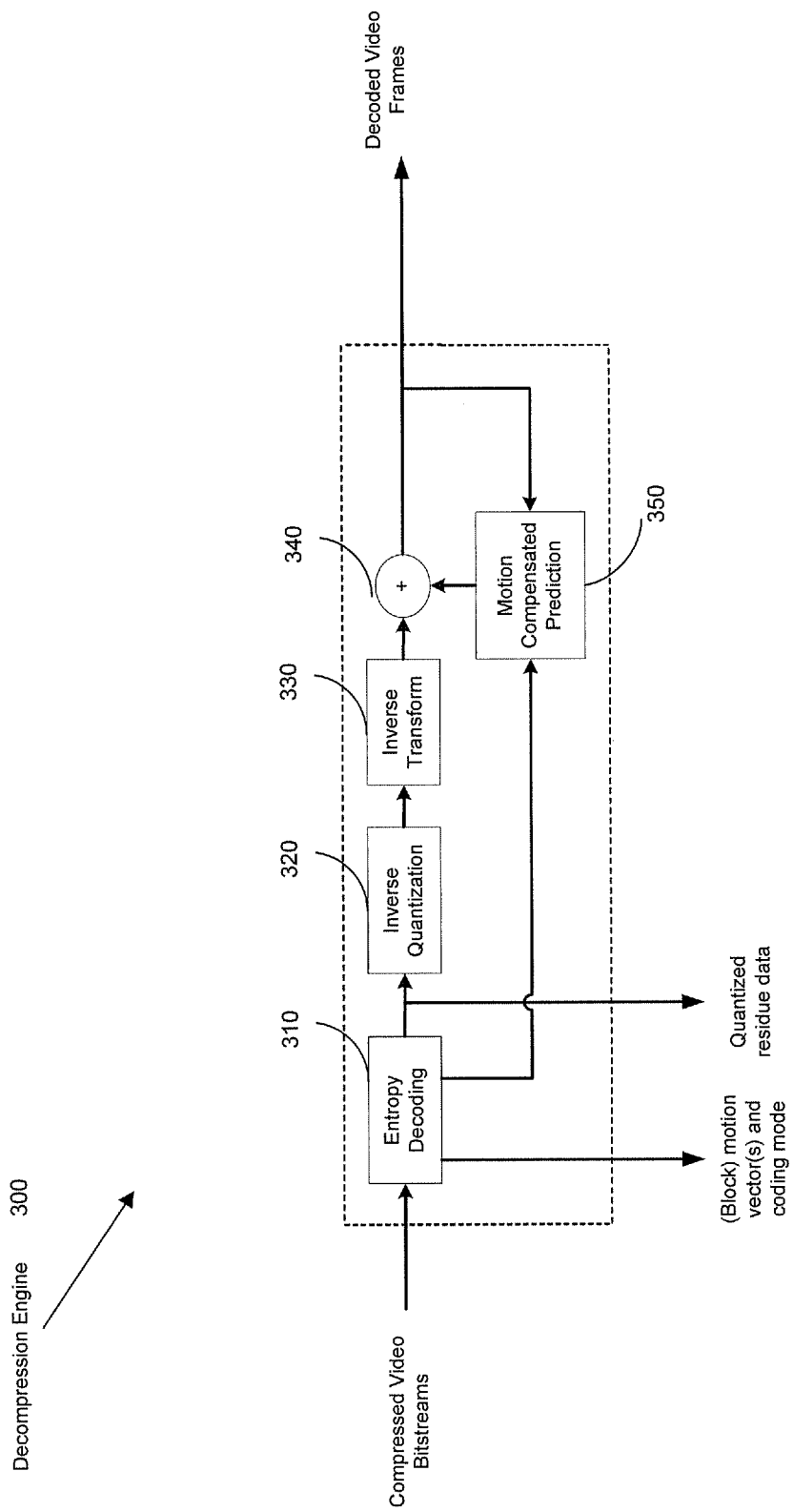
FIG. 3 is a diagram illustrating an exemplary decompression engine that is utilized for a video decompression process in a wireless transmitter, in accordance with an embodiment of the invention.

FIG. 3 is a diagram illustrating an exemplary decompression engine that is utilized for a video decompression process in a wireless transmitter, in accordance with an embodiment of the invention. Referring to FIG. 3, there is shown a decompression engine 300. The decompression engine 300 may comprise an entropy decoding unit 310, an inverse quantization unit 320, an inverse transform unit 330, a combiner 340, and a motion compensation prediction unit 350, respectively.

The entropy decoding unit 310 may comprise suitable logic, circuitry, interfaces and/or code that may be operable to decode entropy-coded data. The entropy decoding unit 310 may be operable to transform binary bits of the entropy-coded data to symbols (quantized residual data), which may be fed or communicated to subsequent decoding modules such as the inverse quantization unit 320 and the inverse transform unit 330 to get decoded video frames. The transformation of the binary bits to symbols (quantized residual data) may be implemented in various ways. For example, in MPEG, an entropy decoding may be realized using a Variable-Length Decoding (VLD) followed by a Run-Length Decoding (RLD). The entropy-coded data may be accepted compressed video bitstreams comprising compressed 2D video bitstreams and/or compressed 3D video bitstreams from the video feed 110. In this regard, the entropy decoding unit 310 may be operable to extract coding information such as block motion vector from accepted compressed video bitstreams. The extracted coding information may comprise, for example, block motion vectors, block coding modes, quantization levels, and/or quantized residual data associated with the accepted compressed video bitstreams.

The inverse quantization unit 320 may comprise suitable logic, circuitry, and/or code that may be operable to scale and/or re-scale the quantized residual data of a decoded video frame from the entropy decoding unit 310 to reconstruct a video frame with a limited set of colors that associate each color with its nearest representative. The inverse quantization unit 320 may be utilized to, for example, reduce perceived distortion in the reconstructed picture.

The inverse transform unit 330 may comprise suitable logic, circuitry, interfaces and/or code that may be operable to combine standard basis patterns to form residual macroblocks for each inverse quantized video frame from the inverse quantization unit 320.

The motion compensation prediction (MCP) unit 350 may comprise suitable logic, circuitry, and/or code that may be operable to provide a prediction for macroblocks in an uncompressed video frame to a video encoder such as a 2D video encoder for compressing 2D video bitstreams or a 3D video encoder for compressing 3D video bitstreams. Pixel intensities of the macroblocks in a current frame may be predicted based on a motion model, and pixel intensities of the macroblocks in previous/future reference frames. The difference between the predicted pixel intensities and the actual current pixel intensities may be considered as a prediction error. The prediction error may be communicated to the combiner 340 where it may be utilized for reconstructing corresponding uncompressed macroblocks in the current frame.

The combiner 340 may comprise suitable logic, circuitry, interfaces and/or code that may be operable to combine a residual macroblock from the inverse transform unit 330 with corresponding prediction error information from the motion compensation prediction (MCP) unit 350 to create a reconstructed uncompressed macroblock.

In operation, the entropy decoding unit 310 may be operable to receive compressed video bitstreams from the video feed 110. The entropy decoder 310 may be operable to transform binary bits of the received compressed video bitstreams to video quantized residual data. The quantized residual data may be fed into the inverse quantization unit 320. The inverse quantization unit 320 may be operable to rescale the quantized residual data to reconstruct a video frame with a limited set of colors. The reconstructed video frame may be communicated to the inverse transform unit 330. The inverse transform unit 330 may be operable to inverse transform the reconstructed video frame to form a residual video frame comprising a plurality of residual macroblocks. A residual macroblock in the residual picture may be formed by comparing a macroblock in the reconstructed video frame with one or more standard basis patterns. The residual video frame may be combined at the combiner 340 with prediction errors from the motion compensation prediction (MCP) unit 350 to create a reconstructed decoded/uncompressed video frame.

Figure 4:
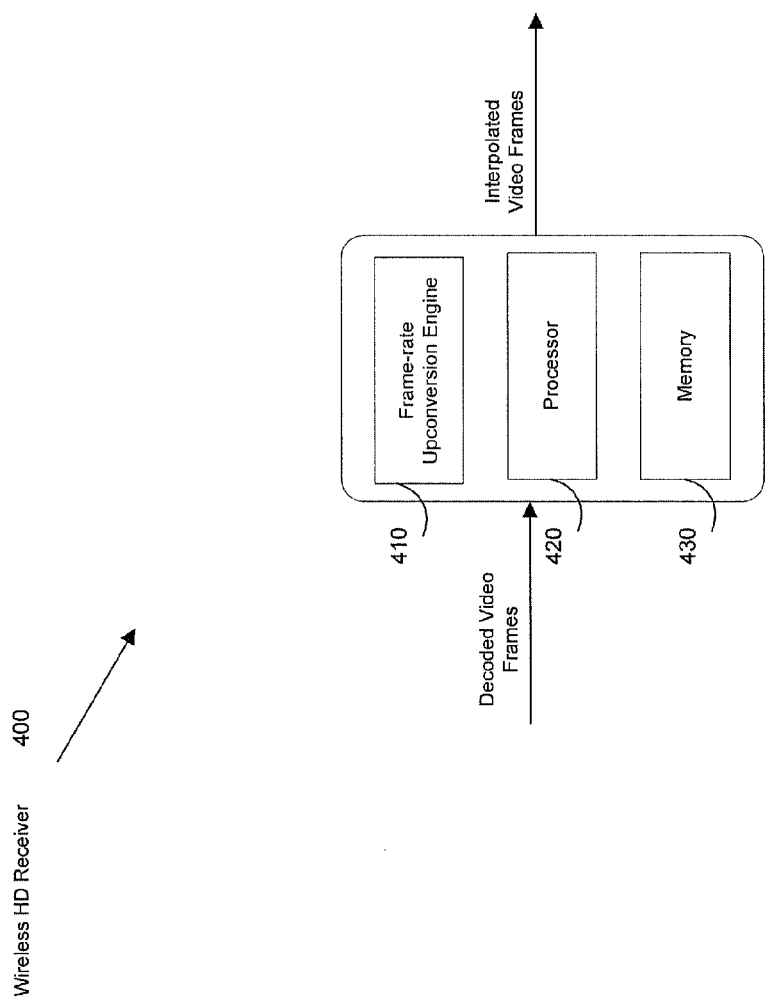
FIG. 4 is a diagram illustrating an exemplary wireless HD receiver that is utilized to receive decompressed video bitstreams over a wireless HD transmission link, in accordance with an embodiment of the invention.

FIG. 4 is a diagram illustrating an exemplary wireless HD receiver that is utilized to receive decompressed video bitstreams over a wireless HD transmission link, in accordance with an embodiment of the invention. Referring to FIG. 4, there is shown a wireless HD receiver 400. The wireless HD receiver 400 may comprise a frame-rate up-conversion engine 410, a processor 420, and a memory 430.

The frame-rate up-conversion engine 410 may comprise suitable logic, circuitry, interfaces and/or code that may be operable to up-convert frame rate to provide high picture quality results for a high quality video source comprising, for example, a Digital Betacam, camera video, and/or telecine transferred films. In this regard, the frame-rate up-conversion engine 410 may be operable to perform frame-rate up-conversion by utilizing coding information extracted from uncompressed video bitstreams, whether uncompressed 2D video bitstreams or uncompressed 3D video bitstreams, received by the wireless HD receiver 400. The extracted coding information may comprise block motion vectors, block coding modes, quantization levels, and quantized residual data associated with original compressed video bitstreams of the received uncompressed video bitstreams. Various frame-rate up-conversion algorithms such as frame repetition and linear interpolation by temporal filtering may be utilized by the frame-rate up-conversion engine 410 to construct interpolated video frames with higher frame-rate for display on a modern screen such as the display device 150.

The processor 420 may comprise suitable logic, circuitry, interfaces and/or code that may be operable to process decoded video frames received from the wireless HD transmitter 120. The processor 420 may be operable to communicate the received decoded or uncompressed video frames with the frame-rate up-conversion engine 410 to up-convert frame rate of the received decoded video frames. The processor 420 may be operable to perform video frame interpolation via the frame-rate up-conversion engine 410 and resulted interpolated video frames may be displayed on the display device 150.

The memory 430 may comprise suitable logic, circuitry, interfaces and/or code that may enable storing of information such as executable instructions and data that may be utilized by the processor 420 as well as the frame-rate up-conversion engine 410. The executable instructions may comprise frame-rate up-conversion algorithms that may be utilized by the frame-rate up-conversion engine 410. The data may comprise decoded video frames and extracted coding information such as block motion vectors, block coding modes, quantization levels, and quantized residual data. The data may comprise interpolated video frames constructed by the frame-rate up-conversion engine 410 for display on the display device 150. The memory 430 may comprise RAM, ROM, low latency nonvolatile memory such as flash memory and/or other suitable electronic data storage.

In operation, the processor 420 may be operable to receive decoded or uncompressed video bitstreams with lower frame-rates from the wireless HD transmitter 110 over the wireless HD transmission link 130. The received decoded video bitstreams may comprise decoded 2D video bitstreams and/or decoded 3D video bitstreams. The processor 420 may be operable to communicate the received decoded video bitstreams with the frame-rate up-conversion engine 410 to up-convert frame-rate of the received decoded video frames. The processor 420 and the frame-rate up-conversion engine 410 may be operable to utilize the memory 430 for a frame-rate up-conversion. The frame-rate up-conversion engine 410 may be operable to perform frame-rate up-conversion resulting interpolated video frames. The processor 420 may be operable to communicate with the display device 150 for display of the resulted interpolated video frames to users.

Figure 5:
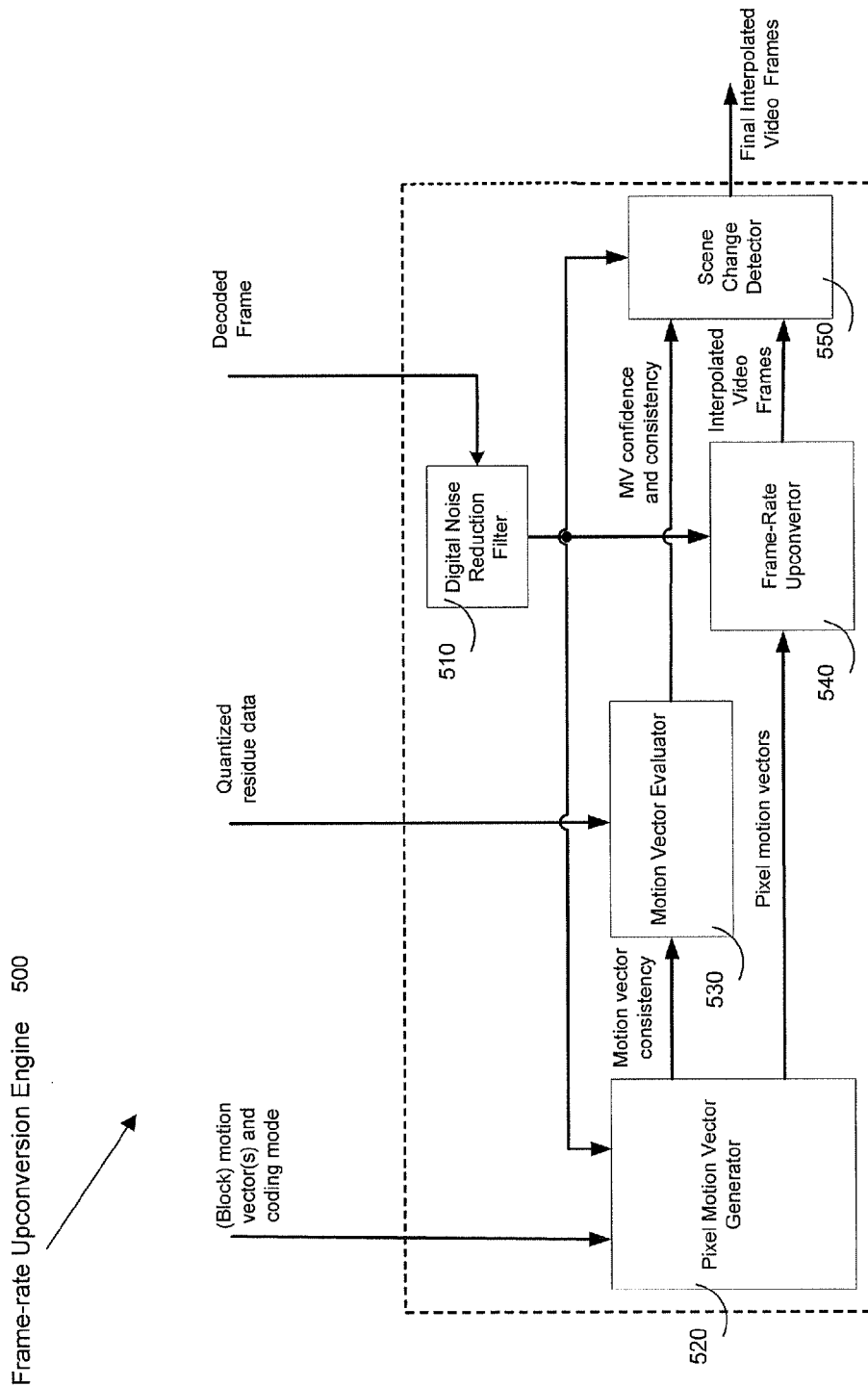
FIG. 5 is a diagram illustrating an exemplary frame-rate up-conversion engine that is utilized by a wireless HD receiver for motion-compensated interpolation, in accordance with an embodiment of the invention.

FIG. 5 is a diagram illustrating an exemplary frame-rate up-conversion engine that is utilized by a wireless HD receiver for motion-compensated interpolation, in accordance with an embodiment of the invention. Referring to FIG. 5, there is shown a digital noise reduction filter 510, a pixel motion vector generator 520, a pixel motion vector evaluator 530, a frame-rate up-convertor 540, and a scene change detector 550.

The digital noise reduction filter 510 may comprise suitable logic, circuitry, interfaces and/or code that may be operable to perform noise reduction on decoded video frames received from the wireless HD transmitter 110. The application of the noise reduction prior to other processing may be essential to achieve a better image quality. Various noise reduction techniques such as, for example, de-blocking, de-ringing, and/or other noise reduction filtering may be applied to the received decoded video frames (reference pictures) by the digital noise reduction filter 510 prior to performing a frame-rate up-conversion.

The pixel motion vector generator 520 may comprise suitable logic, circuitry, and/or code that may be operable to generate pixel motion vectors. The pixel motion vectors may be generated from block motion vectors, which are extracted from decoded video frames received from the wireless HD transmitter 110. The pixel motion vector generator 520 may be operable to refine the extracted block motion vectors and decompose the refined block motion vectors into pixel motion vectors. The pixel motion vectors may be further scaled or re-scaled for constructing interpolated (or inserted) video frames. The pixel motion vector generator 520 may be configured to communicate the pixel motion vectors with the motion vector evaluator 530 and the frame-rate up-convertor 540.

The motion vector evaluator 530 may comprise suitable logic, circuitry, interfaces and/or code that may be operable to evaluate one or both of motion vector confidence and/or motion vector consistence associated with pixel motion vectors generated by the pixel motion vector generator 520. Motion vector confidence of generated pixel motion vectors may be computed in various exemplary ways comprising using quantized residual data and associated quantization level of decoded video frames received from the wireless HD transmitter 110. The quantized residual data and associated quantization level may be extracted from the decoded video frames received. Smaller quantization levels with less residue data may result a higher motion vector confidence while larger quantization levels with more residue data may produce a lower motion vector confidence. The motion vector consistency may be generated by comparing adjacent block motion vectors and motion-compensated block boundary pixel differences. One or both of the motion vector confidence and/or the motion vector consistency may be utilized to generate a confidence-consistency measure for motion judder filtering, for example.

The frame-rate up-convertor 540 may comprise suitable logic, circuitry, interfaces and/or code that may be operable to up-convert frame-rate of decoded video frames received from the wireless HD transmitter 110. The frame-rate up-convertor 540 may be operable to perform motion compensated frame-rate up-conversion using coding information provided by the wireless HD transmitter 110. Pixel motion vectors of the received decoded video frames and/or associated motion vector confidence-consistence may be utilized for the motion compensated frame-rate up-conversion. The frame-rate up-convertor 540 may be operable to interpolate the received decoded video frames using the pixel motion vectors together with the associated motion vector confidence-consistence measure. For example, in instances where motion vector confidence is low, the frame-rate up-convertor 540 may be configured to interpolate reference frames using still pictures, for example, through frame repeating. A higher motion vector confidence may lead to a full motion vector dependent interpolation. The interpolated video frames may be communicated with the scene change detector 550.

The scene change detector 550 may comprise suitable logic, circuitry, and/or code that may be operable to detect scene change in the received interpolated video frames. The scene change detector 550 may be operable to process the received interpolated video frames through, for example, a non-linear filtering process, to reduce artifacts in final interpolated video frames. The scene change detector 550 may take into account motion vector confidence-consistency measure to determine if and when motion compensated interpolation may be likely to fail. The scene change detector 550 may be operable to identify problematic regions within the interpolated video frames and conceal the identified problematic regions by various means such as a non-linear filtering for the final interpolated video frames.

In operation, the wireless HD receiver 120 may be operable to receive decoded video frames from the wireless HD transmitter 110. The received decoded video frames may be communicated with the digital noise reduction filter 510 prior to other processing. The digital noise reduction filter 510 may be operable to perform noise reduction on the received decoded video frames using various noise reduction techniques such as, for example, de-blocking, de-ringing, and/or other noise reduction filtering. The filtered decoded video frames may be communicated with the pixel motion vector generator 520, the motion vector evaluator 530, the frame-rate up-convertor 540, and the scene change detector 550, respectively, for further processing. The pixel motion vector generator 520 may be operable to generate pixel motion vectors from coding information such as block motion vectors extracted from the filtered decoded video frames. The generated pixel motion vectors may be provided to the motion vector evaluator 530 and the frame-rate up-convertor 540, respectively.

The motion vector evaluator 530 may be operable to evaluate one or both of motion vector confidence and/or motion vector consistence of the generated pixel motion vectors and provide a measure of the motion vector confidence-consistence to the scene change detector 550. The frame-rate up-convertor 540 may be operable to up-convert the frame-rate of the filtered decoded video frames using generated pixel motion vectors from the pixel motion vector generator 520. The resulted interpolated video frames from the frame-rate up-convertor 540 may be communicated with the scene change detector 550. The scene change detector 550 may be operable to detect scene change in the received interpolated video frames. The scene change detector 550 may be operable to process the received interpolated video frames to reduce artifacts in final interpolated video frames. The measure of associated one or both of motion vector confidence and/or motion vector consistency may be taken into account to identify problematic regions in the received interpolated video frames. The problematic regions may be concealed by various means such as a non-linear filtering. The final interpolated video frames may be communicated with the display device 150 for display.

Figure 6:
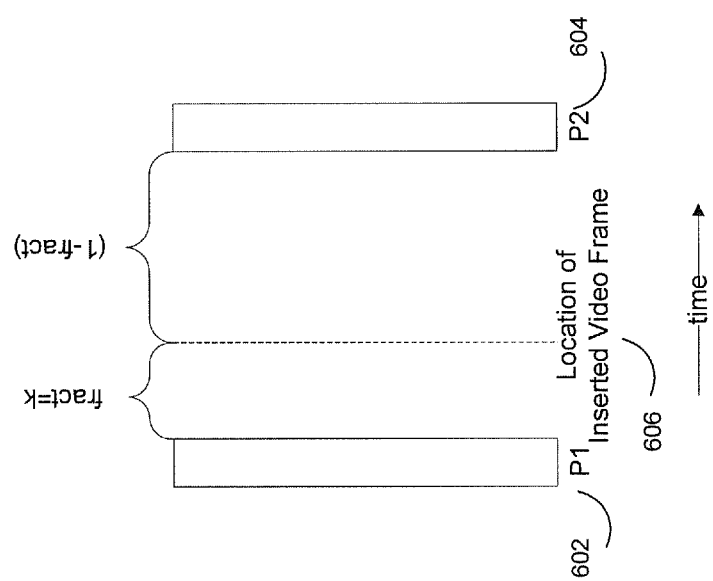
FIG. 6 is a block diagram illustrating insertion of an exemplary interpolated video frame between two reference video frames, in accordance with an embodiment of the invention.

FIG. 6 is a block diagram illustrating insertion of an exemplary interpolated video frame between two reference video frames, in accordance with an embodiment of the invention. Referring to FIG. 6, there is shown a plurality of decoded video frames (reference video frames), for example, P1 602 and P2 604, and the location of an interpolated video frame 606. For example, the interpolated video frame 606 may be inserted k time units from the decoded video frame P1 602.

Figure 7:
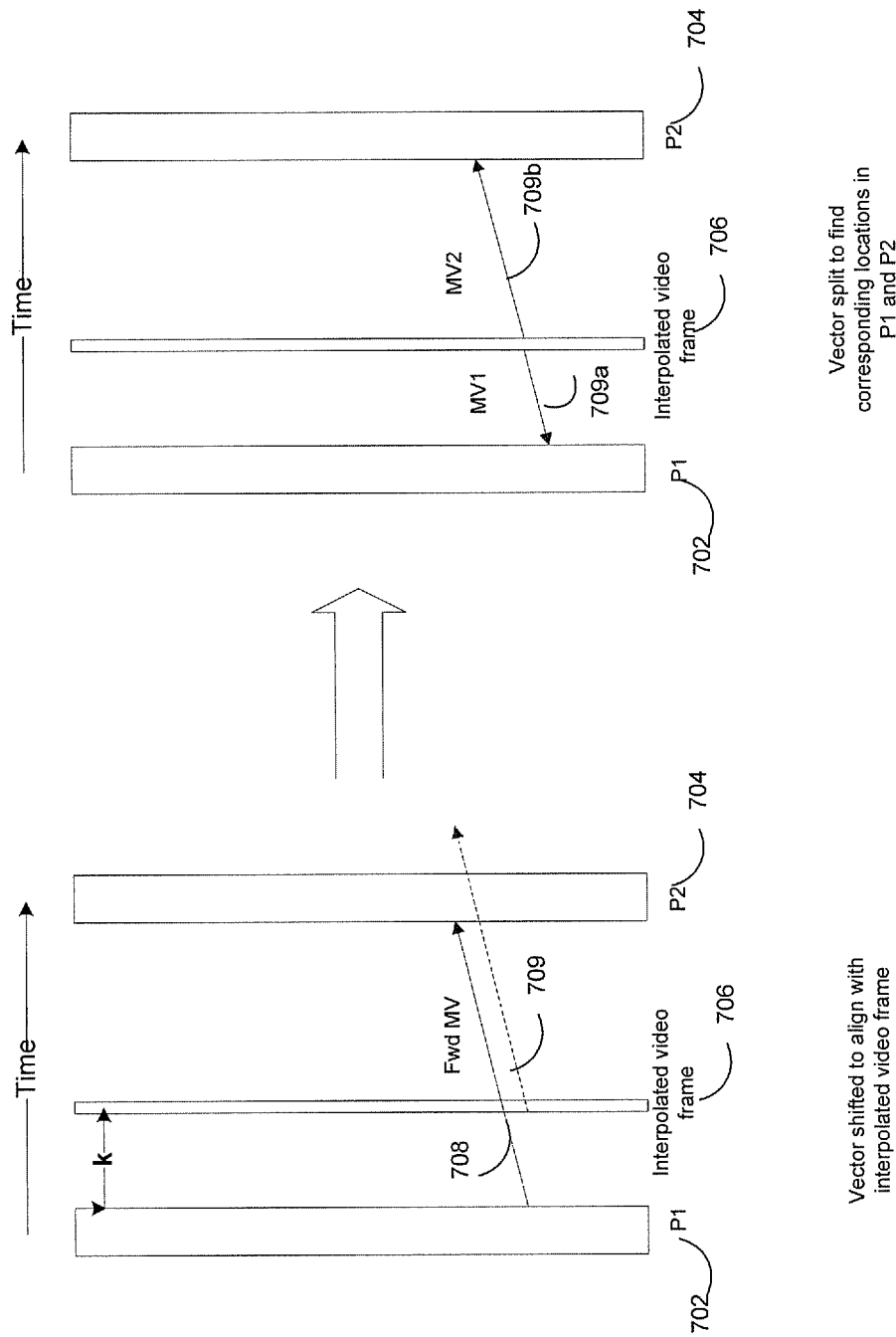
FIG. 7 is a block diagram illustrating exemplary motion vectors of an interpolated video frame, in accordance with an embodiment of the invention.

FIG. 7 is a block diagram illustrating exemplary motion vectors of an interpolated video frame, in accordance with an embodiment of the invention. Referring to FIG. 7, there is shown a plurality of decoded video frames, for example, P1 452 and P2 454 and an interpolated video frame 706. For example, the interpolated video frame 706 may be inserted k time units from the decoded video frame P1 702.

A motion vector 708 may point from an area in the previous video frame P1 702 to an area in the next video frame P2 704, in such a way that the motion vector 708 may capture the motion that occurred between the two original video frames P1 702 and P2 704. The motion vector 709 may be a shifted version of the motion vector 708. The motion vector 709 may be shifted to align with the interpolated video frame 706.

The motion vector 709 may be split into two motion vectors, for example, the motion vectors MV1 709a and MV2 709b. The motion vectors MV1 709a and MV2 709b may be scaled for motion compensated interpolation. The directions of the two scaled motion vectors may be opposite to each other. The length of each of the scaled motion vectors may be proportional to a temporal difference between the interpolated video frame 706 and corresponding original video frame such as the video frame P1 702.

Figure 8:
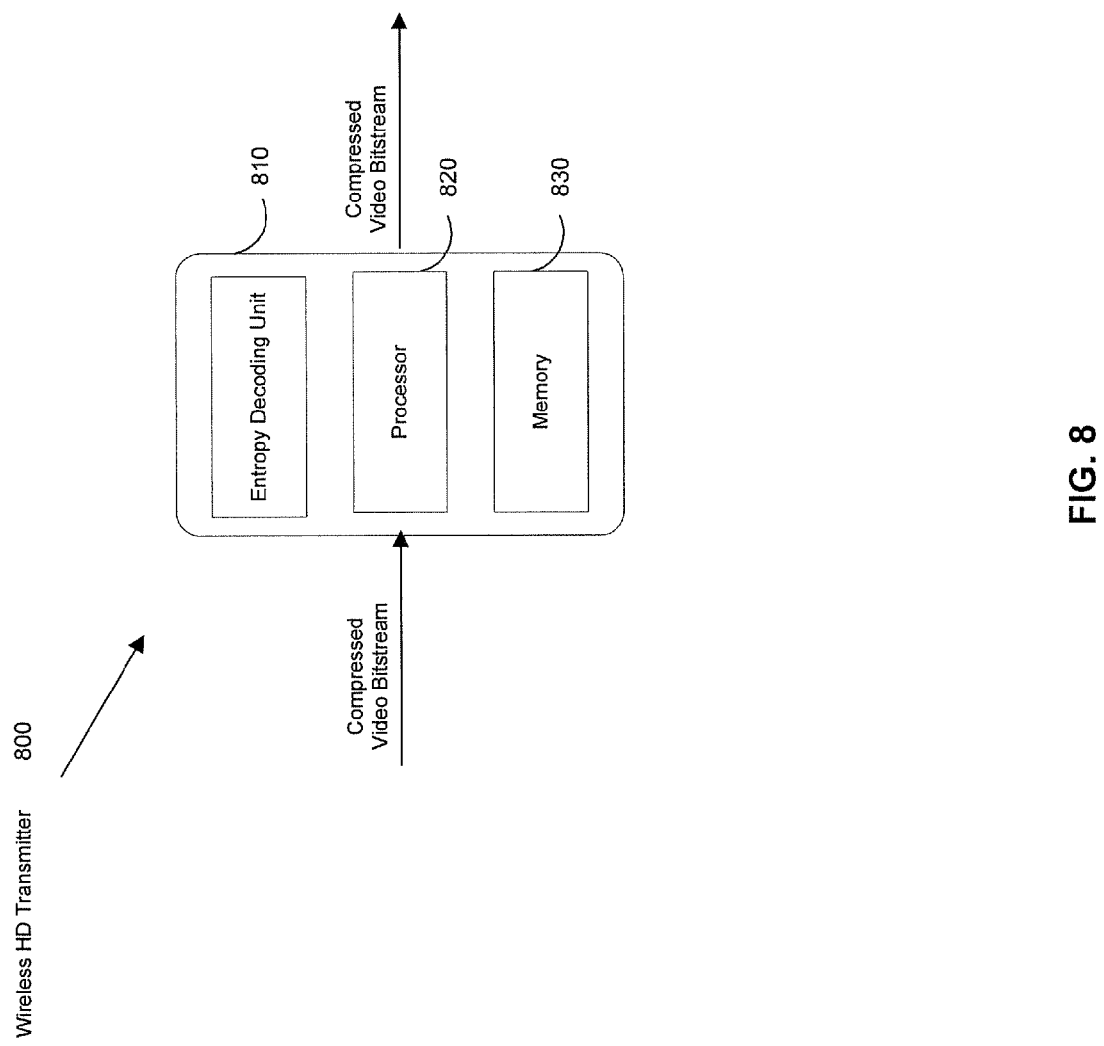
FIG. 8 is a diagram illustrating an exemplary wireless HD transmitter that is operable to transmit compressed video bitstreams over a wireless HD transmission link, in accordance with an embodiment of the invention.

FIG. 8 is a diagram illustrating an exemplary wireless HD transmitter that is operable to transmit compressed video bitstreams over a wireless HD transmission link, in accordance with an embodiment of the invention. Referring to FIG. 8, there is shown a wireless HD transmitter 800. The wireless HD transmitter 800 may comprise an entropy decoding unit 810, a processor 820, and a memory 830.

The entropy decoding unit 810 may comprise suitable logic, circuitry, interfaces and/or code that may be operable to decode entropy-coded data. The entropy decoding unit may perform in the same way as the entropy decoding unit 310 as described with respect to FIG. 3. The entropy decoding unit 810 may be operable to provide coding information from compressed video bitstreams received from the video feed 110. The received video bitstreams may comprise compressed 2D video bitstreams and/or compressed 3D video bitstreams. The extracted coding information may comprise block motion vectors, block coding modes, quantization levels, and/or quantized residual data. A coding mode may comprise information such as, for example, an inter-block based coding or an intra-block based coding, and a block size. The extracted coding information may be communicated with the processor 820.

The processor 820 may comprise suitable logic, circuitry, interfaces and/or code that may be operable to process compressed video bitstreams received from the video feed 110. The processor 820 may be operable to insert the extracted coding information such as block motion vectors, block coding modes, quantization levels, and/or quantized residual data, into the received compressed video bitstreams to communicate with a target video receiver such as the wireless HD receiver 140 via the wireless HD transmission link 130. The processor 820 may be operable to communicate with the memory 830 to provide various algorithms utilized by the entropy decoding unit 810. The processor 820 may be configured to communicate with the wireless HD receiver 140 to determine a video format supported for corresponding video transmission. The determined video format may be utilized by the processor 820 to communicate the compressed video bitstreams together with inserted coding information to the wireless HD receiver 140.

The memory 830 may comprise suitable logic, circuitry, interfaces and/or code that may enable storing of information such as executable instructions and data that may be utilized by the processor 820 and the entropy decoding unit 810. The executable instructions may comprise video decoding algorithms that may be utilized by the entropy decoding unit 810 for various entropy decoding operations. The data may comprise received compressed video bitstreams and extracted coding information. The memory 830 may comprise RAM, ROM, low latency nonvolatile memory such as flash memory and/or other suitable electronic data storage.

In operation, the processor 820 may be operable to receive compressed video bitstreams with lower frame-rates from a video feed such as the IP TV network 112. The processor 820 may be operable to communicate the received compressed video bitstreams with the entropy decoding unit 810 for entropy decoding. The entropy decoding unit 810 may be configured to provide coding information such as, for example, block motion vectors, block coding modes, quantization levels, and/or quantized residual data, to the processor 820. The processor 820 may be operable to insert the coding information into the received compressed video bitstreams to communicate with the wireless HD receiver 140 in a supported format.

Figure 9:
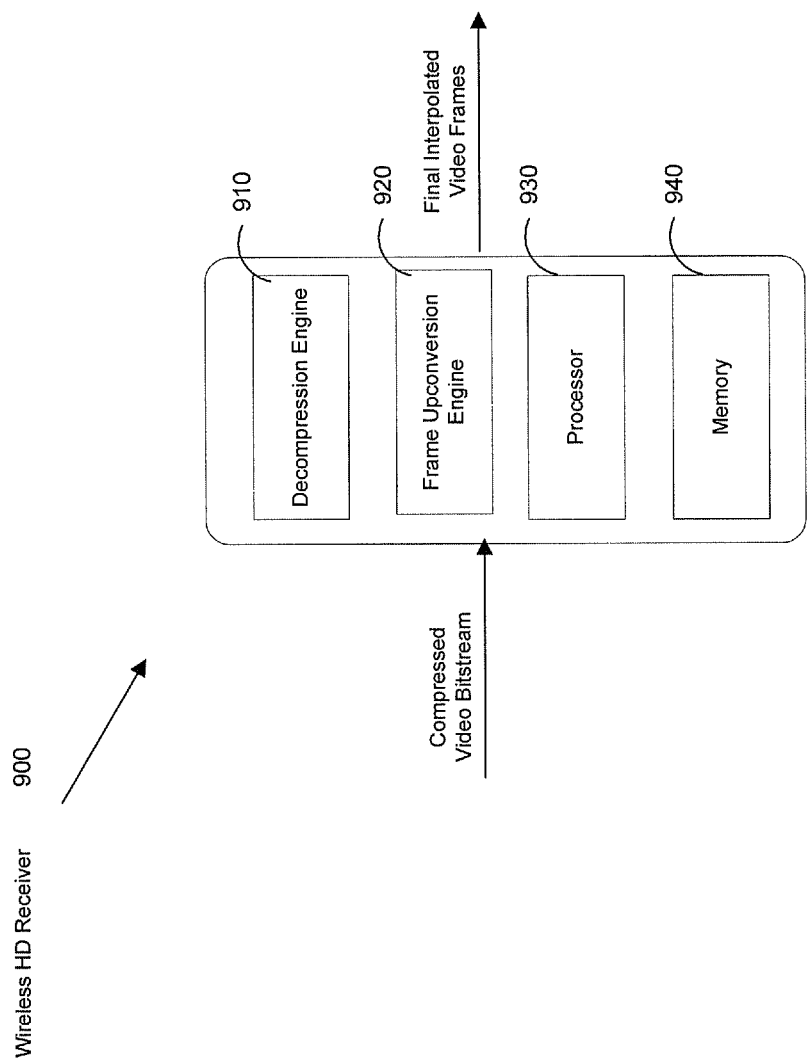
FIG. 9 is a diagram illustrating an exemplary wireless HD receiver that is utilized to receive compressed video bitstreams over a wireless HD transmission link, in accordance with an embodiment of the invention.

FIG. 9 is a diagram illustrating an exemplary wireless HD receiver that is utilized to receive compressed video bitstreams over a wireless HD transmission link, in accordance with an embodiment of the invention. Referring to FIG. 9, there is shown a wireless HD receiver 900. The wireless HD receiver 900 may comprise a decompression engine 910, a frame-rate up-conversion engine 920, a processor 930, and a memory 940.

The decompression engine 910 may comprise suitable logic, circuitry, interfaces and/or code that may be operable to decompress compressed video bitstreams, whether compressed 2D video bitstreams and/or compressed 3D video bitstreams, received from the wireless HD transmitter 120 to generate decoded video frames. The decompression engine 910 may be operable to perform various video decoding/decompression operations such as, for example, entropy decoding, inverse quantization, inverse transform, and motion compensated prediction. The decompression engine 910 may be operable to provide decoded video frames to the frame-rate up-conversion engine 920 for further video decoding processing.

The frame-rate up-conversion engine 920 may comprise suitable logic, circuitry, and/or code that may be operable to up-convert frame rate to provide high picture quality results for a high quality video source comprising, for example, a Digital Betacam, camera video, and/or telecine transferred films. In this regard, the frame-rate up-conversion engine 920 may be operable to extract coding information such as, for example, block motion vectors, block coding modes, quantization levels, and quantized residual data, from the received compressed video bitstreams from the wireless HD transmitter 120. The extracted coding information may be utilized to perform frame-rate up-conversion on the received compressed video bitstreams. Various frame-rate algorithms such as frame repetition and linear interpolation by temporal filtering may be utilized by the frame-rate up-conversion engine 920 to construct interpolated video frames with a high-picture-rate for display on the display device 150.

The processor 930 may comprise suitable logic, circuitry, interfaces and/or code that may be operable to process compressed video bitstreams received from the wireless HD transmitter 120. The processor 930 may be operable to communicate the received compressed video bitstreams with the decompression engine 910 for corresponding decoded video frames of the received compressed video bitstreams. The decoded video frames may be served as reference video frames in the frame-rate up-conversion for final interpolated video frames. The processor 930 may be operable to communicate the final interpolated video frames with the display device 150 for display, for example.

The memory 940 may comprise suitable logic, circuitry, interfaces and/or code that may enable storing of information such as executable instructions and data that may be utilized by the processor 930, the frame-rate up-conversion engine 920, and/or the decompression engine 910. The executable instructions may comprise various video process algorithms such as video decompression and frame-rate up-conversion that may be utilized by the decompression engine 910 and the frame-rate up-conversion engine 920, respectively. The data may comprise compressed video bitstreams received from the wireless HD receiver 120, coding information extracted from the received compressed video bitstreams, decoded video frames, and/or interpolated video frames. The extracted coding information may comprise block motion vectors, block coding modes, quantization levels, and quantized residual data, for example, to be utilized by the frame-rate up-conversion engine 920. The memory 940 may comprise RAM, ROM, low latency non-volatile memory such as flash memory and/or other suitable electronic data storage.

In operation, the processor 930 may be operable to receive compressed video bitstreams from the wireless HD transmitter 120. The processor 930 may be operable to communicate the received compressed video bitstreams with the decompression engine 910 for corresponding decoded video frames. The decoded video frames may be interpolated by the frame-rate up-conversion engine 920 resulting interpolated video frames. In this regard, the frame-rate up-conversion engine 920 may be operable to utilize coding information extracted from the received compressed video bitstreams in the frame-rate up-conversion. The resulted interpolated video frames constructed by the frame-rate up-conversion engine 920 may be communicated with the processor 930 for display on the display device 150.

Figure 10:
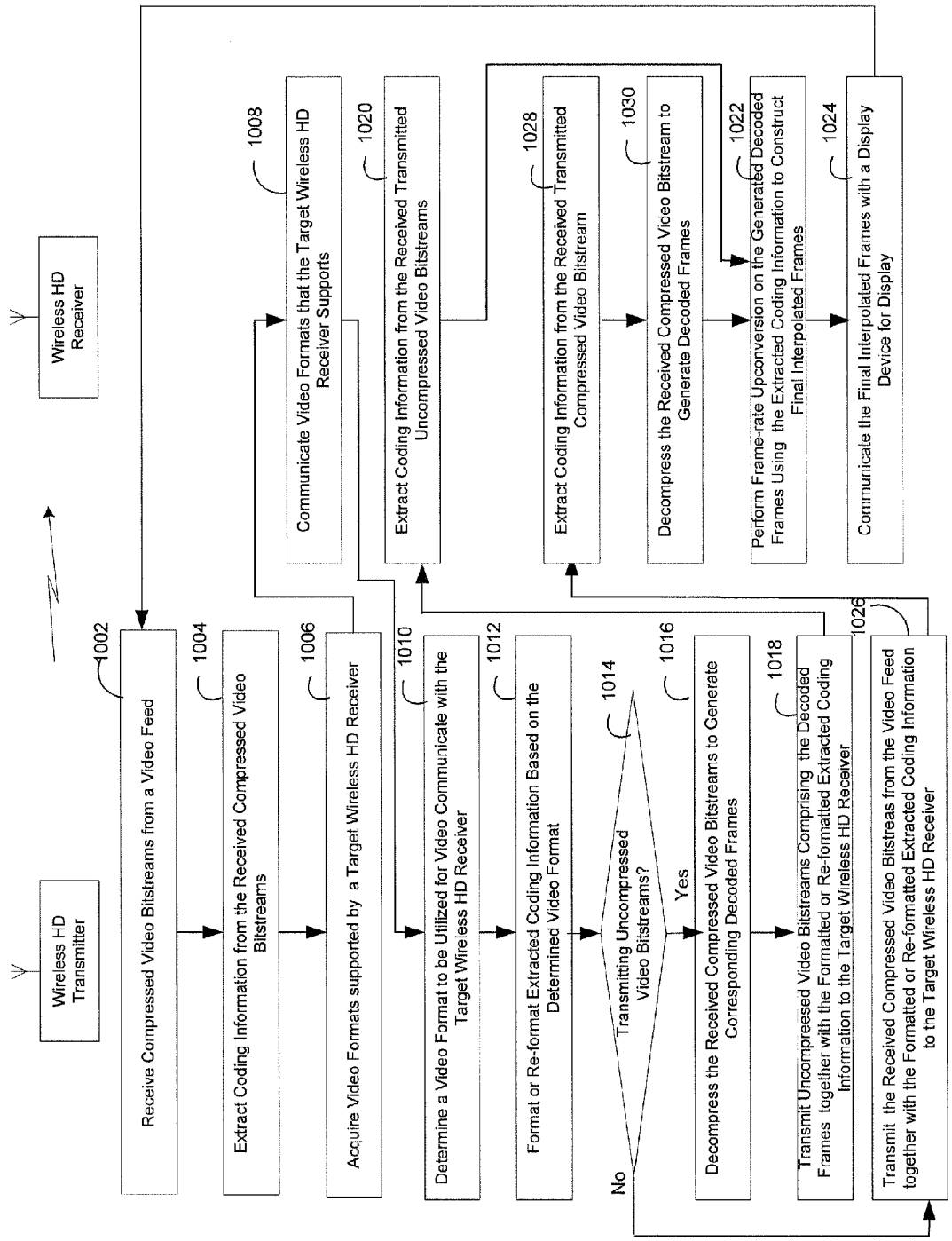
FIG. 10 is a flow chart illustrating exemplary steps for motion-compensated frame-rate up-conversion with wireless HD for both compressed and decompressed video bitstreams, in accordance with an embodiment of the invention.

FIG. 10 is a flow chart illustrating exemplary steps for motion-compensated frame-rate up-conversion with wireless HD for both compressed and decompressed video bitstreams, in accordance with an embodiment of the invention. The exemplary steps start with step 1002, where the wireless HD transmitter 120 may be operable to receive/accept compressed video bitstreams from the video feed 110. The received compressed video bitstreams may comprise compressed 2D video bitstreams and/or compressed 3D video bitstreams. In step 1004, the wireless HD transmitter 120 may be operable to extract coding information from the received compressed video bitstreams by performing entropy decoding. The extracted coding information may comprise, for example, block motion vectors, block coding modes, quantization levels, and/or quantized residual data. In step 1006, the wireless HD transmitter 120 may be operable to acquire information such as video formats that a target receiver such as the wireless HD receiver 140 may be able to support.

In step 1008, the wireless HD receiver 140 may be configured to provide video format information to the wireless HD transmitter 120 for video communication. In step 1010, the wireless HD transmitter 120 may be operable to determine or select a video format to be utilized for video communicate with the wireless HD receiver 140. In step 1012, the wireless HD transmitter 120 may be operable to format or re-format the extracted coding information using the determined or selected video format. In step 1014, it may be determined if the wireless HD transmitter 120 may be configured to transmit uncompressed video bitstreams to the wireless HD receiver 140. In instances where the wireless HD transmitter 120 may be configured to transmit uncompressed video bitstreams to the wireless HD receiver 140, then in step 1016, the wireless HD transmitter 120 may be operable to decode or decompress the received compressed video bitstreams via the decompression engine 210 to generate corresponding decoded video frames.

In step 1018, the wireless HD transmitter 120 may be operable to transmit uncompressed video bitstreams comprising the decoded video frames and the formatted or re-formatted extracted coding information to the wireless HD receiver 140. In step 1020, the wireless HD receiver 140 may be operable to receive the transmitted uncompressed video bitstreams. The wireless HD receiver 140 may be configured to extract coding information from the received uncompressed video streams. In step 1022, the wireless HD receiver 140 may be operable to perform frame-rate up-conversion on the received decoded video frames to construct final interpolated video frames using the extracted coding information. In step 1024, the wireless HD receiver 140 may be operable to communicate the constructed final interpolated video frames with the display device 150 for display. The exemplary process may return to the step 1002.

In step 1014, in instances where the wireless HD transmitter 120 may be configured to transmit compressed video bitstreams to the wireless HD receiver 140, then in step 1026, the wireless HD transmitter 120 may be configured to transmit the received compressed video bitstreams together with the formatted or re-formatted extracted coding information to the wireless HD receiver 140. In step 1028, the wireless HD receiver 140 may be configured to extract coding information from received compressed video bitstreams from the wireless HD transmitter 120. In step 1030, the wireless HD receiver 140 may be operable to decompress the received compressed video bitstreams from the wireless HD transmitter 120 to generate corresponding decoded video frames. The exemplary process continues in step 1022.

Figure 11:
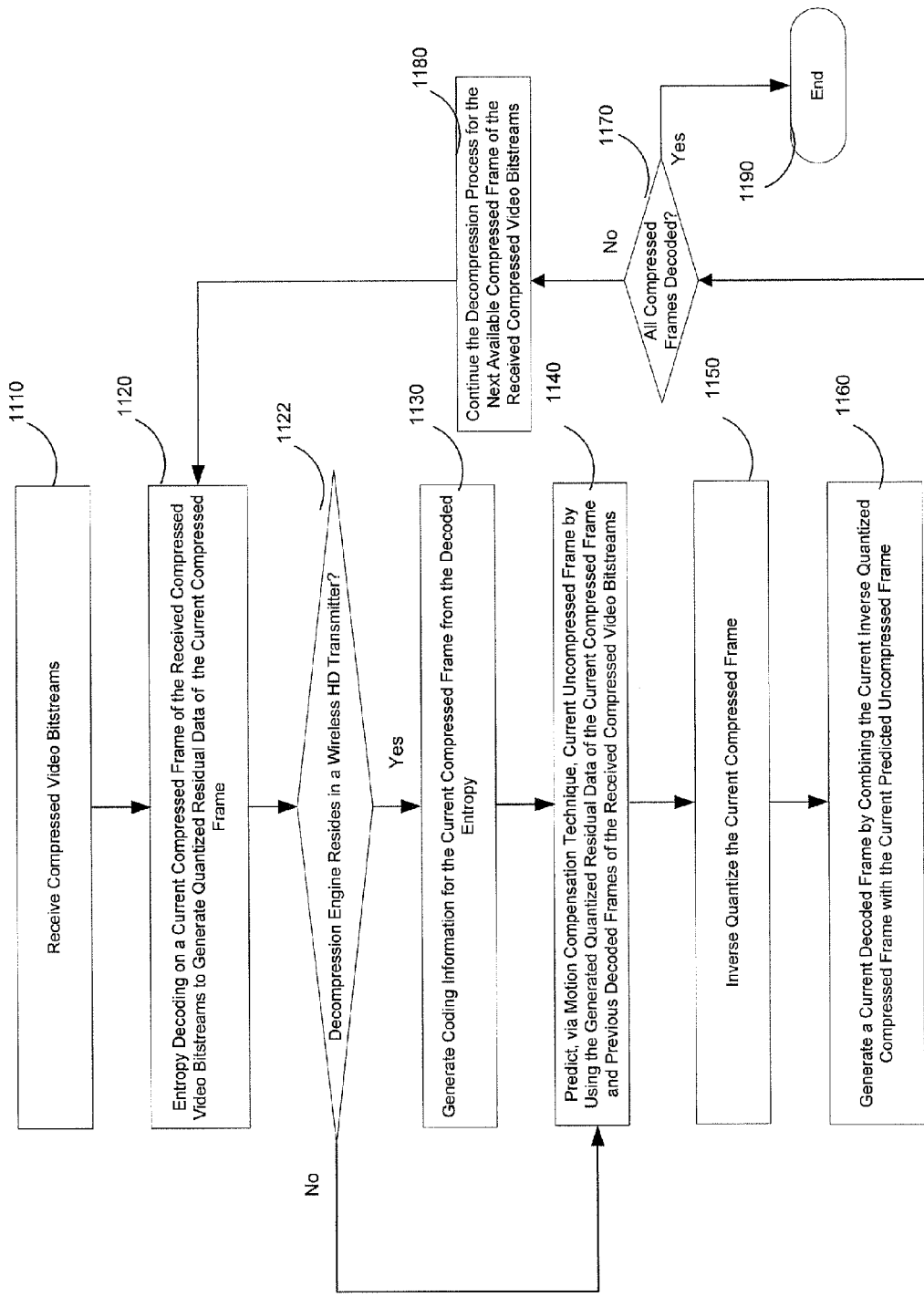
FIG. 11 is a flow chart illustrating exemplary steps for video decompression, in accordance with an embodiment of the invention.

FIG. 11 is a flow chart illustrating exemplary steps for video decompression, in accordance with an embodiment of the invention. Referring to FIG. 11. the exemplary steps start with step 1110, where a decompression engine such as, for example, the decompression engine 210 on the wireless HD transmitter 200 and/or the decompression engine 910 on the wireless HD receiver 900, may be operable to receive compressed video bitstreams. The received compressed video bitstreams may comprise compressed 2D video bitstreams and/or compressed 3D video bitstreams. The compressed video bitstreams received by the decompression engine 210 may be received directly from the video feed 110. However, the compressed video bitstreams received by the decompression engine 910 may be communicated by the wireless HD transmitter 120 over the wireless HD transmission link 130. In step 1120, the decompression engine 210 or 910 may be operable to perform entropy decoding on a current compressed video frame of the received compressed video bitstreams to generate quantized residual data of the current compressed video frame.

In step 1122, it may be determined whether the decompression engine resides on the wireless HD transmitter 120. In instances where the decompression engine such as the decompression engine 210 resides on the wireless HD transmitter 120, then in step 1130, the decompression engine 210 may be operable to generate coding information for the current compressed video frame through entropy decoding. In step 1140, a current uncompressed video frame may be predicted by the decompression engine 210 or 910, via a motion compensation technique, by using the generated quantized residual data of the current compressed video frame and one or more previous decoded video frames of the received compressed video bitstreams.

In step 1150, the decompression engine 210 or 910 may be operable to inverse quantize the current compressed video frame. In step 1160, the decompression engine 210 or 910 may be operable to generate a current decoded video frame by combining the current inverse quantized compressed video frame with the current predicted uncompressed video frame. In step 1170, it may be determined whether compressed video frames in the received compressed video bitstreams have been decoded. In instances where compressed video frames in the received compressed video bitstreams have not been decoded, then the exemplary process may continue for the next available compressed video frame of the received compressed video bitstreams and return to step 1120.

In step 1122, in instances where the decompression engine such as the decompression engine 910 resides on the wireless HD receiver 140, then the exemplary process may continue in step 1140. In step 1170, in instances where the compressed video frames in the received compressed video bitstreams have been decoded, then the exemplary process may be end with step 1190.

Figure 12:
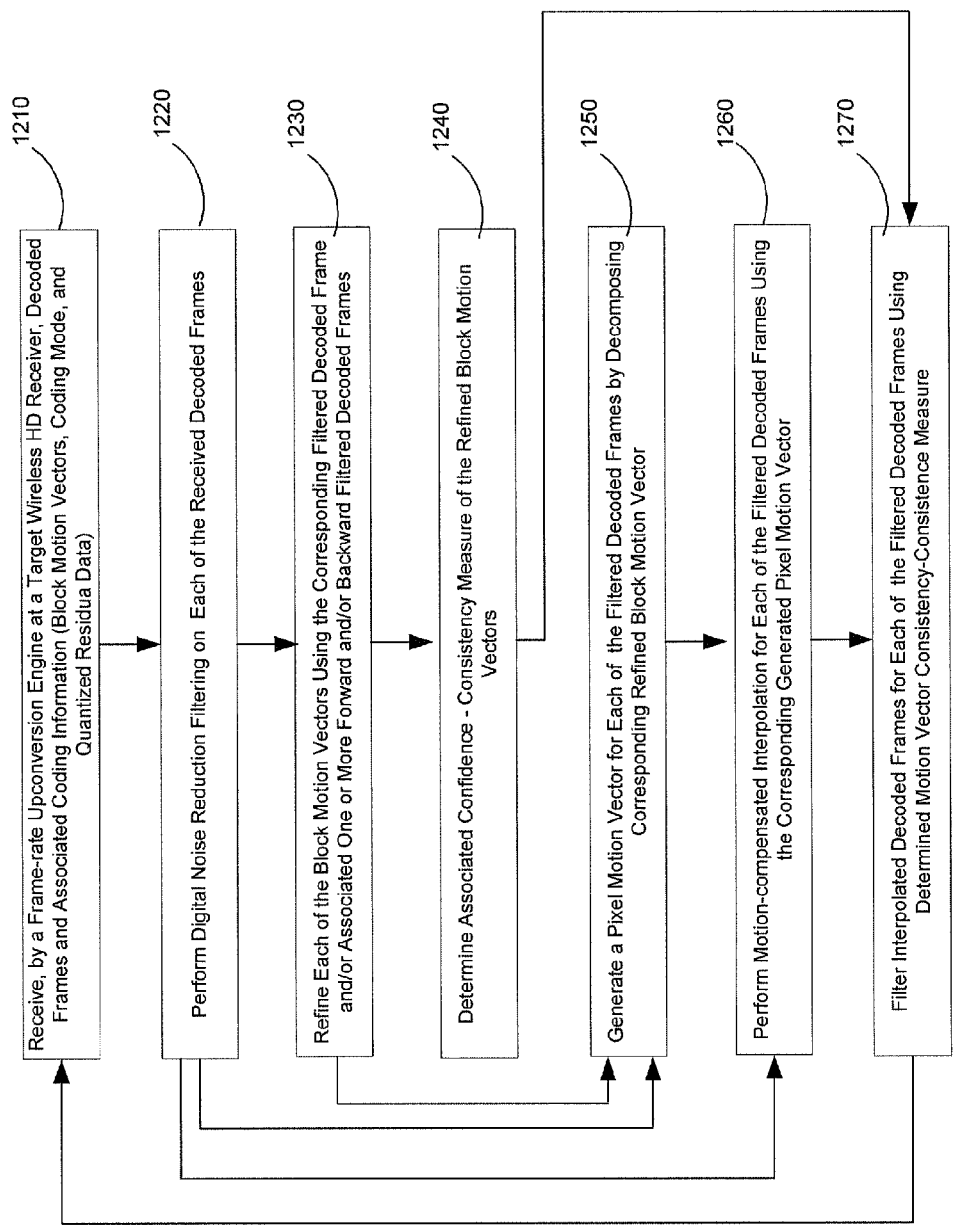
FIG. 12 is a flow chart illustrating exemplary steps for motion-compensated frame-rate up-conversion that is performed by a wireless HD receiver for both compressed and decompressed video bitstreams, in accordance with an embodiment of the invention.

FIG. 12 is a flow chart illustrating exemplary steps for motion-compensated frame-rate up-conversion that is performed by a wireless HD receiver for both compressed and decompressed video bitstreams, in accordance with an embodiment of the invention. Referring to FIG. 12, the exemplary steps start with step 1210, where a frame-rate up-conversion engine such as 410 and/or 920 at the wireless HD receiver 140 may be operable to receive decoded video frames and associated coding information comprising, for example, block motion vectors, coding mode, and/or quantized residua data. The received decoded video frames may comprise decoded 2D video frames and/or decoded 3D video frames. In step 1220, the frame-rate up-conversion engine, such as 410 and/or 920, may be operable to perform digital noise reduction filtering on each of the received decoded video frames.

In step 1230, the frame-rate up-conversion engine such as 410 and/or 920 may be operable to refine each of the block motion vectors using the corresponding filtered decoded video frame and/or associated one or more forward and/or backward filtered decoded video frames. In step 1240, a motion vector confidence-consistency measure may be determined for each of the refined block motion vectors. In step 1250, a pixel motion vector is generated for each of the filtered decoded video frames by, for example, decomposing corresponding refined block motion vector. In step 1260, the frame-rate up-conversion engine such as 410 and/or 920 may be operable to perform motion-compensated interpolation for each of the filtered decoded video frames using the corresponding generated pixel motion vector. In step 1270, interpolated decoded video frames for each of the filtered decoded video frames may be filtered and/or guarded by considering corresponding determined motion vector consistency-consistence measure. The filtered interpolated decoded video frames may be communicated with the display device 150 for display. The exemplary steps may return to step 1210.

Aspects of a method and system for motion-compensated frame-rate up-conversion for both compressed and decompressed video bitstreams are provided. In accordance with various embodiments of the invention, a video receiver, such as the wireless HD receiver 140, may be operable to receive 3D video bitstreams from a video transmitter such as the wireless HD transmitter 120 over, for example, the wireless HD transmission link 130. The received 3D video bitstreams may comprise coding information and a plurality of video frames for display on the display device 150. The wireless HD receiver 140 may be operable to extract the coding information from the received 3D video bitstreams. The wireless HD receiver 140 may be operable to perform frame-rate up-conversion via the frame-rate up-conversion engine 410 or 920 on the received plurality of video frames using the extracted coding information. The coding information may be generated by the wireless HD transmitter 120 via entropy decoding a compressed video from the video feed 110 from, for example, the cable TV network 111, the IP TV network 112, the satellite broadcasting network 113, the mobile communication network 114, the video camcorder 115, and/or the camera 116, respectively. The extracted coding information may comprise one or more of block motion vectors, block coding modes, quantization levels, and/or quantized residual data.

The received 3D video bitstreams may comprise uncompressed 3D video or compressed 3D video. In instances where the plurality of video frames for display in the received 3D video bitstreams may comprise a plurality of decoded video frames as described with respect to, for example, FIG. 2 through FIG. 8. The received plurality of decoded video frames may be generated by the wireless HD transmitter 120, which may be operable to utilize the decompression engine 210 to decompress the compressed 3D video from the video feed 110. The decompression engine 210 may be operable to perform various video decoding operations such as, for example, entropy decoding, inverse quantization, inverse transform, and/or motion compensated prediction. The digital noise filter 510 inside the wireless HD receiver 400 may be operable to perform digital noise reduction filtering on each of the received plurality of decoded video frames.

The extracted coding information such as block motion vectors and the filtered decoded video frames may be utilized by the pixel motion vector generator 520 to generate pixel motion vectors for each of the received plurality of decoded video frames. Associated one or both of motion vector confidence and/or motion vector consistence for the generated pixel motion vectors may be computed at the motion vector evaluator 530 to provide a measure of generated pixel motion vectors. A plurality of interpolated video frames may be generated via the frame-rate convertor 540 from the received plurality of decoded video frames based on the generated pixel motion vectors and said computed one or both of motion vector confidence and/or motion vector consistence at the motion vector evaluator 530. The generated plurality of interpolated video frames may be processed, for example, via the scene detector 550. Artifacts such as motion judder may be concealed by performing noise reduction filtering using the computed one or both of motion vector confidence and/or motion vector consistence information.

In instances where the received 3D video bitstreams, at a video receiver such as the wireless HD receiver 900, may comprise a compressed 3D video such as MPEG-2, MPEG-4, AVC, VC1, and/or VP1. The wireless HD receiver 900 may be operable to perform video decoding on the received compressed 3D video via the decompressing engine 910. The decompression engine 910 may be operable to utilize various video decoding techniques comprising, for example, entropy decoding, inverse quantization, inverse transform, and/or motion compensated prediction. A plurality of decoded video frames constructed via the decompression engine 910 may be communicated to the digital noise reduction filter 510 for noise reduction processing of the resulted plurality of decoded video frames. The extracted coding information such as block motion vectors and the filtered resulted plurality of decoded video frames may be utilized by the pixel motion vector generator 520 to generate pixel motion vectors for each of the plurality of decoded video frames. Associated one or both of motion vector confidence and/or motion vector consistence for the generated pixel motion vectors may be computed at the motion vector evaluator 530 to provide measure on generated pixel motion vectors. A plurality of interpolated video frames may be generated via the frame-rate convertor 540 from the received plurality of decoded video frames based on the generated pixel motion vectors and the computed one or both of motion vector confidence and/or motion vector consistence at the motion vector evaluator 530. The generated plurality of interpolated video frames may be processed, for example, via the scene detector 550. Artifacts such as motion judder may be concealed by performing noise reduction filtering using the computed one or both of motion vector confident and/or motion vector consistence information.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for motion-compensated frame-rate up-conversion for both compressed and decompressed video bitstreams.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
   receiving, by a video transmitter, a compressed video bitstream comprising a plurality of video frames;
   acquiring, by the video transmitter from a video receiver, one or more video formats supported by the video receiver;
   determining, by the video transmitter, a video format for video communication between the video transmitter and the video receiver based at least in part on the one or more video formats supported by the video receiver;
   generating, by the video transmitter, formatted coding information by extracting coding information from the compressed video bitstream and formatting the extracted coding information using the video format for video communication between the video transmitter and the video receiver;
   determining, by the video transmitter, whether to transmit compressed or uncompressed video bitstreams to the video receiver based at least in part on the video format for video communication between the video transmitter and the video receiver;
   in response to determining to transmit uncompressed video bitstreams to the video receiver, transmitting, by the video transmitter over a wireless transmission link, an uncompressed video bitstream with the formatted coding information to the video receiver for performing frame-rate up-conversion, wherein the uncompressed video bitstream is generated by decompressing the compressed video bitstream at the video transmitter; and
   in response to determining to transmit compressed video bitstreams to the video receiver, transmitting, by the video transmitter over the wireless transmission link, the compressed video bitstream with the formatted coding information to the video receiver for performing the frame-rate up-conversion.

2. The method according to claim 1, wherein the coding information comprises at least one of block motion vectors, block coding modes, quantization levels, or quantized residual data.

3. The method according to claim 1, further comprising extracting the coding information from the received compressed video bitstream by performing entropy decoding.

4. The method according to claim 1, wherein the compressed video bitstream is received from a video feed including one of a cable TV network, an IP TV network, a satellite broadcasting network, a mobile communication network, a video camcorder, or a camera.

5. The method according to claim 1, wherein the performing of the frame-rate up-conversion comprises:
   performing digital noise reduction filtering on a plurality of decoded video frames; and
   generating a pixel motion vector for each of the plurality of filtered decoded video frames by decomposing a corresponding refined block motion vector obtained using the formatted coding information.

6. The method according to claim 5, wherein the performing of the frame-rate up-conversion further comprises:
   performing motion-compensated interpolation for each of the plurality of filtered decoded video frames using the corresponding pixel motion vector.

7. The method according to claim 1, wherein the compressed video bitstream comprises a three-dimensional (3D) video bitstream.

8. A system for processing signals, the system comprising:
   a video transmitter comprising one or more circuits, the video transmitter configured to:
   receive a compressed video bitstream comprising a plurality of video frames;
   acquire, from a video receiver, one or more video formats supported by the video receiver;
   determine a video format for video communication between the video transmitter and the video receiver based at least in part on the one or more video formats supported by the video receiver;
   generate formatted coding information by extracting coding information from the compressed video bitstream and formatting the extracted coding information using the video format for video communication between the video transmitter and the video receiver;
   determine whether to transmit compressed or uncompressed video bitstreams to the video receiver based at least in part on the video format for video communication between the video transmitter and the video receiver;

in response to determining to transmit uncompressed video bitstreams to the video receiver, transmit, over a wireless transmission link, an uncompressed video bitstream with the formatted coding information to the video receiver for performing frame-rate up-conversion, wherein the uncompressed video bitstream is generated by decompressing the compressed video bitstream at the video transmitter; and in response to determining to transmit compressed video bitstreams to the video receiver, transmit, over the wireless transmission link, the compressed video bitstream with the formatted coding information to the video receiver for performing the frame-rate up-conversion.

9. The system according to claim 8, wherein the coding information comprises at least one of block motion vectors, block coding modes, quantization levels, or quantized residual data.

10. The system according to claim 8, further comprising the video transmitter configured to extract the coding information from the received compressed video bitstream by performing entropy decoding.

11. The system according to claim 8, wherein the compressed video bitstream is received from a video feed including one of a cable TV network, an IP TV network, a satellite broadcasting network, a mobile communication network, a video camcorder, or a camera.

12. The system according to claim 8, wherein the performing of the frame-rate up-conversion comprises:
performing digital noise reduction filtering on a plurality of decoded video frames; and
generating a pixel motion vector for each of the plurality of filtered decoded video frames by decomposing a corresponding refined block motion vector obtained using the formatted coding information.

13. The system according to claim 12, wherein the performing of the frame-rate up-conversion further comprises:
performing motion-compensated interpolation for each of the plurality of filtered decoded video frames using the corresponding pixel motion vector.

14. The system according to claim 8, wherein the compressed video bitstream comprises a three-dimensional (3D) video bitstream.

15. A method for signal processing, the method comprising:
receiving, by a video receiver from a video transmitter via a wireless transmission link, a video bitstream with frame-rate up-conversion coding information, the frame-rate up-conversion coding information being generated by the video transmitter;
extracting, by the video receiver, the frame-rate up-conversion coding information from the video bitstream;
determining, by the video receiver, whether the received video bitstream is a compressed video bitstream or an uncompressed video bitstream;
in response to determining that the received video bitstream is a compressed video bitstream, decompressing the compressed video bitstream to generate a plurality of decoded video frames and performing frame-rate up-conversion on the plurality of decoded video frames using the frame-rate up-conversion coding information; and
in response to determining that the received video bitstream is an uncompressed video bitstream, performing the frame-rate up-conversion on a plurality of decoded video frames comprised in the uncompressed video bitstream using the frame-rate up-conversion coding information.

16. The method according to claim 15, wherein the frame-rate up-conversion coding information comprises at least one of block motion vectors, block coding modes, quantization levels, or quantized residual data.

17. The method according to claim 15, wherein the frame-rate up-conversion coding information is generated by the video transmitter via entropy decoding on a compressed video bitstream received from a video feed including one of a cable TV network, an IP TV network, a satellite broadcasting network, a mobile communication network, a video camcorder, or a camera.

18. The method according to claim 15, further comprising:
performing digital noise reduction filtering on the plurality of decoded video frames; and
generating a pixel motion vector for each of the plurality of filtered decoded video frames by decomposing a corresponding refined block motion vector obtained using the frame-rate up-conversion coding information.

19. The method according to claim 18, further comprising:
performing motion-compensated interpolation for each of the plurality of filtered decoded video frames using the corresponding pixel motion vector.

20. The method according to claim 15, wherein the video bitstream comprises a three-dimensional (3D) video bitstream.

* * * * *